US010623574B2

United States Patent
Matsushima

(10) Patent No.: US 10,623,574 B2
(45) Date of Patent: Apr. 14, 2020

(54) VOICE COMMUNICATION SYSTEM, RELAYING DEVICE, TERMINAL DEVICE, SESSION MANAGEMENT METHOD AND NON-TRANSITORY COMPUTER-READABLE RECORDING MEDIUM

(71) Applicant: ICOM INCORPORATED, Osaka-shi, Osaka (JP)

(72) Inventor: Hisaaki Matsushima, Osaka (JP)

(73) Assignee: ICOM INCORPORATED, Osaka-shi, Osaka (JP)

( * ) Notice: Subject to any disclaimer, the term of this patent is extended or adjusted under 35 U.S.C. 154(b) by 0 days.

(21) Appl. No.: 16/481,935

(22) PCT Filed: Feb. 2, 2018

(86) PCT No.: PCT/JP2018/003508
§ 371 (c)(1),
(2) Date: Jul. 30, 2019

(87) PCT Pub. No.: WO2018/147171
PCT Pub. Date: Aug. 16, 2018

(65) Prior Publication Data
US 2020/0045181 A1    Feb. 6, 2020

(30) Foreign Application Priority Data
Feb. 8, 2017    (JP) .................................. 2017-021644

(51) Int. Cl.
*H04M 3/56* (2006.01)
*H04N 7/15* (2006.01)
(Continued)

(52) U.S. Cl.
CPC .......... *H04M 3/56* (2013.01); *H04L 65/1069* (2013.01); *H04L 65/80* (2013.01); *H04N 7/147* (2013.01); *H04N 7/15* (2013.01); *H04W 4/10* (2013.01)

(58) Field of Classification Search
CPC . H04M 3/56; H04N 7/15; H04W 4/10; H04L 65/1069
(Continued)

(56) References Cited

U.S. PATENT DOCUMENTS

2010/0178895 A1    7/2010    Maeda et al.
2014/0267565 A1*   9/2014    Nakafuji ................ H04N 7/141
                                                        348/14.08
2016/0255202 A1    9/2016    Matsushima

FOREIGN PATENT DOCUMENTS

JP    2006-325261 A    11/2006
JP    2008-166863 A    7/2008
(Continued)

OTHER PUBLICATIONS

English Translation of International Search Report of PCT/JP2018/003508 dated Mar. 27, 2018.

*Primary Examiner* — Thjuan K Addy
(74) *Attorney, Agent, or Firm* — Muncy, Geissler, Olds & Lowe, P.C.

(57) ABSTRACT

[Problem] To enable priority communication using a terminal device by setting a particular mode in the terminal device by user operation and thereby increasing a priority of the terminal device.
[Solution] A server as a relay device, in forming a new session, compares the priority of an existing session with the priority of the new session, and, if the priority of the new session is higher than the priority of the existing session, removes a competing terminal device participating in the existing session from the existing session and makes the (Continued)

competing terminal device participate in the new session. Further, upon reception of a specific calling voice signal specifying the terminal device participating in the existing session as a communication partner from the terminal device set to a particular mode, the relaying device removes the terminal device participating in the existing session from the existing session and makes the terminal device participate in a session to be formed by the specific calling voice signal regardless of the priority of the session.

13 Claims, 11 Drawing Sheets

(51) Int. Cl.
    *H04L 29/06*     (2006.01)
    *H04W 4/10*     (2009.01)
    *H04N 7/14*     (2006.01)

(58) Field of Classification Search
    USPC ............ 379/202.01, 207.02, 208.01, 201.01, 379/212.01, 37
    See application file for complete search history.

(56) References Cited

FOREIGN PATENT DOCUMENTS

| | | |
|---|---|---|
| JP | 2009-217482 A | 9/2009 |
| JP | 2011-061831 A | 3/2011 |
| JP | 2015-111844 A | 6/2015 |
| WO | 2015/068665 A1 | 5/2015 |

\* cited by examiner

TERMINAL TABLE

| TERMINAL ID | ACTIVE FLAG | EMERGENCY FLAG | POSITION INFORMATION |
|---|---|---|---|
| 1 | ○ |  | x1,y1 |
| 2 | ○ | ✔ | x2,y2 |
| 3 | × |  | x3,y3 |
| ... | ... | ... |  |
| 100 | ○ |  | x100,y100 |

Fig. 5A

GROUP TABLE

| GROUP ID | BELONGING TEMINAL |
|---|---|
| G1 | 1,2,3,4,5 |
| G2 | 6,7,8,9,10 |
| ... | ... |
| G20 | 96,97,98,99,100 |
| A | 1,2,3,...,99,100 |

Fig. 5B

PRIORITY TABLE

| COMMUNICATION MODE (CALLING TYPE) | PRIORITY |
|---|---|
| PLENARY COMMUNICATION | 1 (HIGH) |
| INDIVIDUAL COMMUNICATION | 2 |
| GROUP COMMUNICAITON | 3 (LOW) |

Fig. 5C

MIXING TABLE

| SESSION ID | EMERGENCY FLAG | CALLING TERMINAL | TERMINAL LEFT FROM SESSION | PARTICIPATING TERMINAL |
|---|---|---|---|---|
| G1 | – | 1 | 5 | 1,2,3,4 |
| 19 | – | 5 | – | 5,19 |
| 30 | – | 30 | – | 30,31 |

Fig. 6A

MIXING TABLE

| SESSION ID | EMERGENCY FLAG | CALLING TERMINAL | TERMINAL LEFT FROM SESSION | PARTICIPATING TERMINAL |
|---|---|---|---|---|
| G1 | ✔ | 2 | – | 1,2,3,4,5 |
| 30 | – | 30 | – | 30,31 |

Fig. 6B

VOICE COMMUNICATION SYSTEM, RELAYING DEVICE, TERMINAL DEVICE, SESSION MANAGEMENT METHOD AND NON-TRANSITORY COMPUTER-READABLE RECORDING MEDIUM

TECHNICAL FIELD

The present invention relates to a voice communication system using a network, and more particularly to moving of call priority in the voice communication system.

BACKGROUND ART

A LAN transceiver system performing a communication using local area network (LAN) with operation feeling similar to typical handy transceivers is put into practice (Patent Literature 1, for example). In this system, a voice signal is packetized and then transceived (transmitted and received) on the network. By allowing a server, that is a relaying device, to relay the voice signal (voice packets) among terminal devices by transceiving (transmitting and receiving) the voice signal, a voice call among terminal devices is put into practice.

In this system, order of priority has been set to a plural kinds of calling type (communication mode), and when receiving a call from a terminal device, the server decides whether to connect the terminal device to the communication (session) or not in accordance with the calling type.

CITATION LIST

[Patent Literature 1] International Publication WO/2015/068665

Problems to be Solved by Invention

As mentioned above, the system of the Patent Literature 1, the priority has been fixed for each of the calling type. This priority is stored in the server and cannot be flexibly moved by a user of the terminal device.

The user of the terminal device often wishes to make a call to other terminal devices at higher priority than usual. Especially in case of emergency, the user of the terminal device needs to make a call to other terminal devices at the highest priority of all other calls to notify the emergency and needs to make users of the other terminal devices respond to the emergency. However, in the system according to the Patent Literature 1, the user of the terminal device could not move the priority of the call or could not give higher priority to the terminal device itself.

Accordingly, the object of the invention is to realize a voice communication system capable of moving the priority of the call performed by particular terminal device by the user operation.

SUMMARY OF INVENTION

The present invention is a voice communication system having a relaying device and a plurality of terminal devices communicating with each other over a communication network. The terminal device is provided with a voice transmission unit transmitting a calling voice signal attached information specifying the terminal device of a communication partner to the relaying device and a mode setting unit for setting the own terminal device to a particular mode. The relaying device is provided with a session management unit, a voice transfer unit, and a priority information storage unit. The session management unit forms a session of voice communication when the calling voice signal is received from the terminal device, this terminal device and a terminal device specified by the calling voice signal participates in the session. The voice transfer unit mutually transfers the voice signal among the terminal devices participating in a session. The priority information storage unit stores a priority information pertaining to the session.

The session management unit further processes as follows. When the calling voice signal specifying the terminal device participating in an existing session as a communication partner is received from the terminal device not set to the particular mode, the session management unit decides a priority between the existing session and a new session to be formed by the current calling voice signal in accordance with the priority information. Consequently, the session management unit removes the terminal device participating in the existing session from the existing session, and makes the terminal device participate in the new session when the priority of the new session is higher than the priority of the existing session. When a specific calling voice signal specifying the terminal device participating in the existing session as a communication partner is received from the terminal device set to the particular mode, the terminal device participating in the existing session is removed from the existing session and made to participate in the existing session to be formed by the specific calling voice signal regardless of the priority of both sessions.

In the abovementioned invention, the terminal device is further provide with a notification signal transmission unit transmitting the specific signal attached information specifying a transfer destination terminal device to the relaying device when the terminal device is set to the particular mode, and a notification unit outputting by a voice and/or a display indicating the particular mode of the terminal device when the terminal device is set to the particular mode. The transmission of the specific signal is performed without a user operation of the terminal device, and may perform regularly. In a network communication, the specific signal may be realized by means of a packet.

The relaying device may be further provided with a specific signal transfer unit transferring the specific signal to the terminal device specified as the transfer destination when the specific signal is received. The voice transfer unit and the specific signal transfer unit function respectively, and the specific signal is further transferred to the terminal device under transmission of other voice signal.

The notification unit of the terminal device outputs by a voice and/or a display indicating the particular mode of another terminal device when the specific signal transferred from the relaying device is received. Even if the terminal device is receiving other voice signal and replaying the voice signal, this output is performed, and it can be notified to the user that the another terminal device is in the particular mode.

The terminal device may be further provided with an operation unit receiving the user operation, and a non-operation decision unit measuring non-operation time that the user does not operate the operation unit. Then, the mode setting unit may set the own terminal device to the particular mode when the non-operation decision unit measures predetermined time. As a result, the terminal device can notify other terminal device that the user is in a situation of not being able to operate the terminal device as being the particular mode.

In the abovementioned invention, the operation unit includes a PTT switch operating the voice transmission unit, and when the particular mode is set due to non-operation, function of the PTT switch may be halted. The mode setting unit cancels the particular mode when an operation of the operation unit is detected.

The relaying device according to the invention is provided with a network communication unit, the session management unit, the voice transfer unit, and the priority information storage unit. The network communication unit is connected with the communication network, and communicate with the plurality of the terminal devices over the communication network. When the calling voice signal attached information specifying the terminal device of a communication partner is received from the terminal device, the session management unit forms a session of the voice communication in which this terminal device and other terminal device specified by this calling voice signal participate. The voice transmission unit mutually transmits the voice signal among the terminal devices participating in the session. The priority information storage unit stores the priority information concerning the session.

Moreover, the session management unit processes described below. When the calling voice signal specifying the terminal device participating in the existing session as a communication partner is received, the session management unit decides the priority between the existing session and a new session to be formed by the current calling voice signal in accordance with the priority information, and when the priority of the new session is higher than the priority of the existing session, the terminal device participating in the existing session is removed from the existing session, and is made to participate in the new session. When the calling voice signal specifying the terminal device participating in the existing session as a communication partner is received from the terminal device set to the particular mode, the terminal device participating in the existing session is removed from the existing session regardless of the priority of both sessions, and is made to participate in a session to be formed by the calling voice signal.

The terminal device according to the present invention is provided with the network communication unit, the voice transmission unit, a notification signal transmission unit, and the notification unit. The network communication unit communicates with the relaying device over the communication network. The voice transmission unit transmits to the relaying device the calling voice signal attached information specifying the terminal device of the communication partner to the voice signal. The mode setting unit sets the own terminal device to the particular mode. The notification signal transmission unit transmits to the relaying device the specific signal attached information specifying a destination terminal device when the terminal device set to the particular mode. The notification unit outputs by voice and/or on a display indicating the particular mode of the terminal device when the terminal device is set to the particular mode. The voice transmission unit attaches information to the calling voice signal indicating the own terminal device is setting to the particular mode when the terminal device is set to the particular mode. Moreover, the notification unit may output by the voice and/or on the display indicating the particular mode of other terminal device when the specific signal transferred from the relaying device is received.

The terminal device might be further provided with the operation unit receiving a user operation and the non-operation decision unit measuring non-operation time that user does not operate the operation unit. The mode setting unit sets the own terminal device to the particular mode when the non-operation decision unit measures predetermined time.

In the abovementioned invention, the operation unit includes the PTT switch for making the voice transmission unit operate, and may halt function of the PTT switch when the terminal device sets to the particular mode. The mode setting unit cancels the particular mode when an operation of the operation unit is detected.

A session management method according to the present invention makes the relaying device connected with the communication network perform processing described below. When the call signal from a calling terminal device on the network to another terminal device is received, the relaying device forms a session of the voice communication including the calling terminal device and a called terminal device which is the another terminal device as participating terminal devices. When a certain terminal device becomes in a condition of participating a plurality of sessions after having performed the abovementioned processing for a plurality of times, the relaying device decides the session in being participated by the certain terminal device in accordance with the predetermined priority. When the relaying device receives a call signal attached information indicating a particular mode calling to a terminal device which already participates in another session, the relaying device deletes the terminal device from the another session and makes the competed terminal device participate in the session of the call signal.

A program according to the present invention makes the control unit of the relaying device communicating with the plurality of the terminal device over the communication network function as a session management means and a transfer means. The session management means forms the session of the voice communication being participated by this terminal device and the terminal device specified by this calling voice signal when the calling voice signal attached information specifying the terminal device of the communication partner in the voice signal from the terminal device is received. The transfer means mutually transfers the voice signal among the terminal devices participating in the session.

The session management means further process described below. The session management means decides a priority between an existing session and a new session to be formed by the calling voice signal in accordance with a predetermined priority information when a calling voice signal specifying the terminal device participating in the existing session as a communication partner is received, and removes the terminal device participating in the existing session from the existing session and make the terminal device participate in the new session when the priority of the new session is higher than the priority of the existing session. The session management means removes the terminal device participating in the existing session from the existing session and makes the terminal device participate in a session to be formed by this calling voice signal regardless of the priority of both sessions when the calling voice signal specifying the terminal device participating in the existing session as the communication partner is received from the terminal device set to the particular mode.

In the abovementioned invention, when the specific signal attached information specifying the destination terminal device is received from the terminal device set to the particular mode, the control unit may be further functioned as the specific signal transfer means transferring the specific signal to the terminal device specified as the transfer destination separately from the transfer of the voice signal.

Advantageous Effect of Invention

According to the present invention, the particular mode is set to the terminal device by user operation, and a priority communication in the terminal device set to the particular mode becomes available.

BRIEF DESCRIPTION OF DRAWINGS

FIG. 5A shows a terminal table provided in the server.
FIG. 5B shows a group table provided in the server.
FIG. 5C shows a priority table provided in the server.
FIG. 6A shows a mixing table provided in the server.
FIG. 6B shows a mixing table provided in the server.
FIG. 7C shows a flow chart of an operation when a PTT switch of the terminal device is turning on.

DETAILED DESCRIPTION OF THE EMBODIMENT

Figure 1:
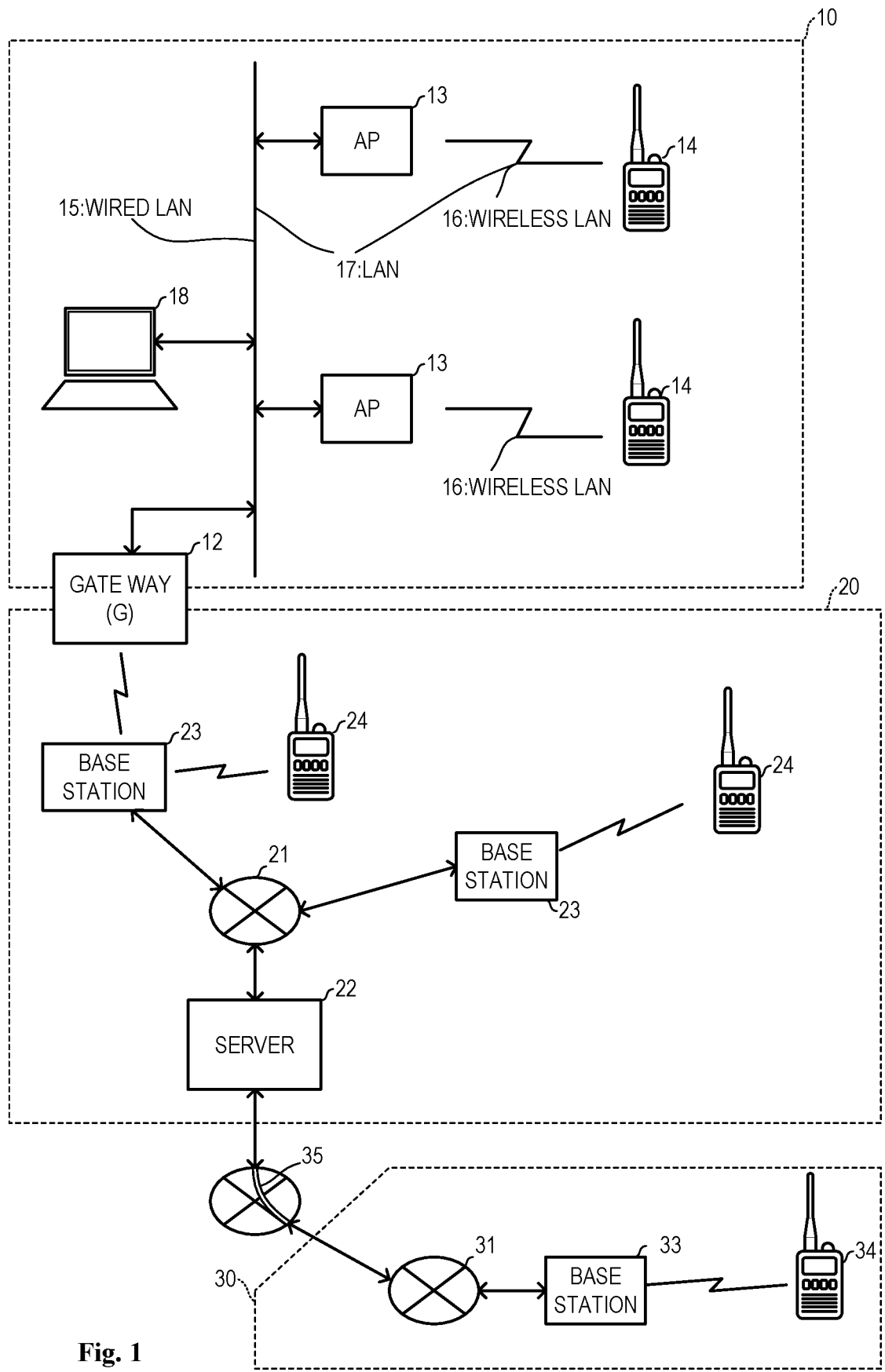
FIG. 1 shows a structural diagram of a voice communication system of an embodiment of the present invention.

A voice communication system of present invention will be described by referring to the drawings. FIG. 1 is a structural diagram of the voice communication system which is an embodiment of the present invention. The voice communication system has a LAN side system 10, a LTE side system 20, 30, and a gateway 12 connecting the LAN side system 10 and the LTE side system 20. A server 22 is installed on the LTE side system 20. The server 22 is connected with the second LTE side system 30 via a VPN 35. The LAN side system 10 has a LAN (local area network) 17 comprising with a wired LAN 15 and a wireless LAN 16 as a communication infrastructure. As for the wireless LAN 16, a communication method conforming to IEEE 802.11 such as Wi-Fi may be applicable. The LTE side system has a LTE network (a packet communication network communicating by LTE (Long Term Evolution) mode which is a communication method employed by mobile phone carrier) 21 as a communication infrastructure. The LTE side system 30 also has the LTE network 31 of a different mobile phone carrier from the LTE network of the LTE side system 20. In the system 10, 20 and 30, each of a LAN terminal device 14 and LTE terminal devices 24, 30 is included, respectively. The LAN terminal device 14, and the LTE terminal devices 24, 34 perform voice communication with each other exceeding the systems.

The LAN terminal device 14, and the LTE terminal devices 24, 34 are constituted in nearly the same except that network for use are different. The LAN terminal device 14, and the LTE terminal devices 24, 34 all have similar appearance to a handy transceiver for wireless communication and are provided with a PTT (push to talk) switch. However, The LAN terminal device 14, and the LTE terminal devices 24, 34 are wireless network devices for transceiving (transmitting and receiving) a voice signal via an access point (AP) 13 or base stations 23, 33. A LTE server 22 which is a relaying device relays mutual communication among the LAN terminal 14 and the LTE terminal devices 24, 34. It should be noted that, in the following description, matters common to the LAN terminal device 14 and the LTE terminal devices 24, 34 are merely described as the terminal device, and not numbered.

Figure 3:
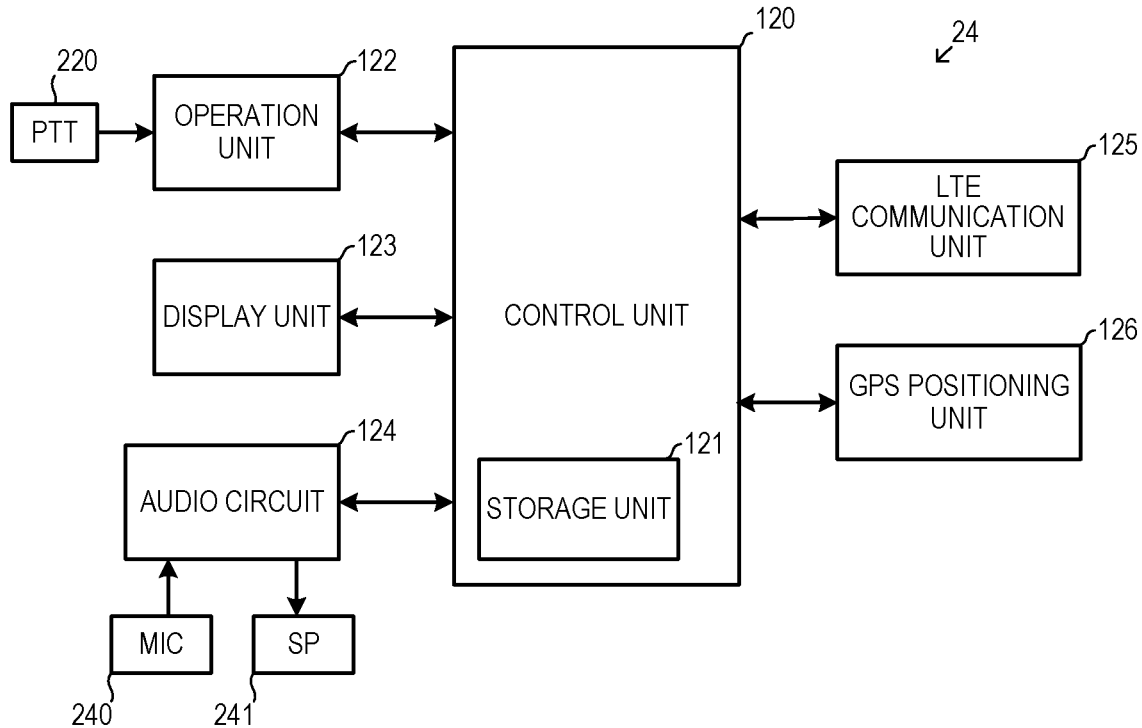
FIG. 3 shows a block diagram of a terminal device.

A management device 18 is connected to the wired LAN 15. The management device 18 is a personal computer installed with a management program. The management program incorporates a so called map software. The management device 18 displays a map on the screen, and displays icons showing the current locations of the LTE terminal devices 24, 30 which are scattered in and moving to respective places on the map in real time. The current locations of each of the LTE terminal devices 24, 34 are measured by a GPS positioning unit equipped on the LTE terminal devices 24, 34 (as shown in FIG. 3) and transmitted to the server 22 at predetermined timing. The management device 18 acquires the current position of the LTE terminal devices 24,34 from the server 22 and displays the current position on the screen. The current position of the LAN terminal device 14 may be measured by the GPS positioning unit 126 or calculated in accordance with the access point 13 the LAN terminal device 14 logging in.

The terminal device enters into an emergency mode by user operation or when the user does not operate the terminal device for a long time. The details of the emergency mode will be described later. When the terminal device enters into the emergency mode, an alert packet is transmitted to the server 22. When the server 22 receives the alert packet form the terminal device, the matter that the terminal device is in the emergency mode is registered into a terminal table. The management device 18 acquires information of the terminal device in the emergency mode from the server 22 and changes the icon of the terminal device displayed on the map to that has an appearance showing the emergency mode. The appearance showing the emergency mode is change of color (to the red) or flickering for example. As just described, by displaying the location of the terminal device on the map, in particular by displaying the location of the terminal device in the emergency mode, management and emergency response of a plurality of the terminal devices can be simplified. The alert packet corresponds to the specific signal according to the present invention.

In the voice communication system, a communication control such as transceiving the voice signal, start/stop of the communication, and selection of a communication partner are performed with using a voice packet. In other words, without a procedure for establishing the communication session such as SIP processing before transmitting the voice packet, communication starts by transmitting the voice packet itself.

Figure 2:
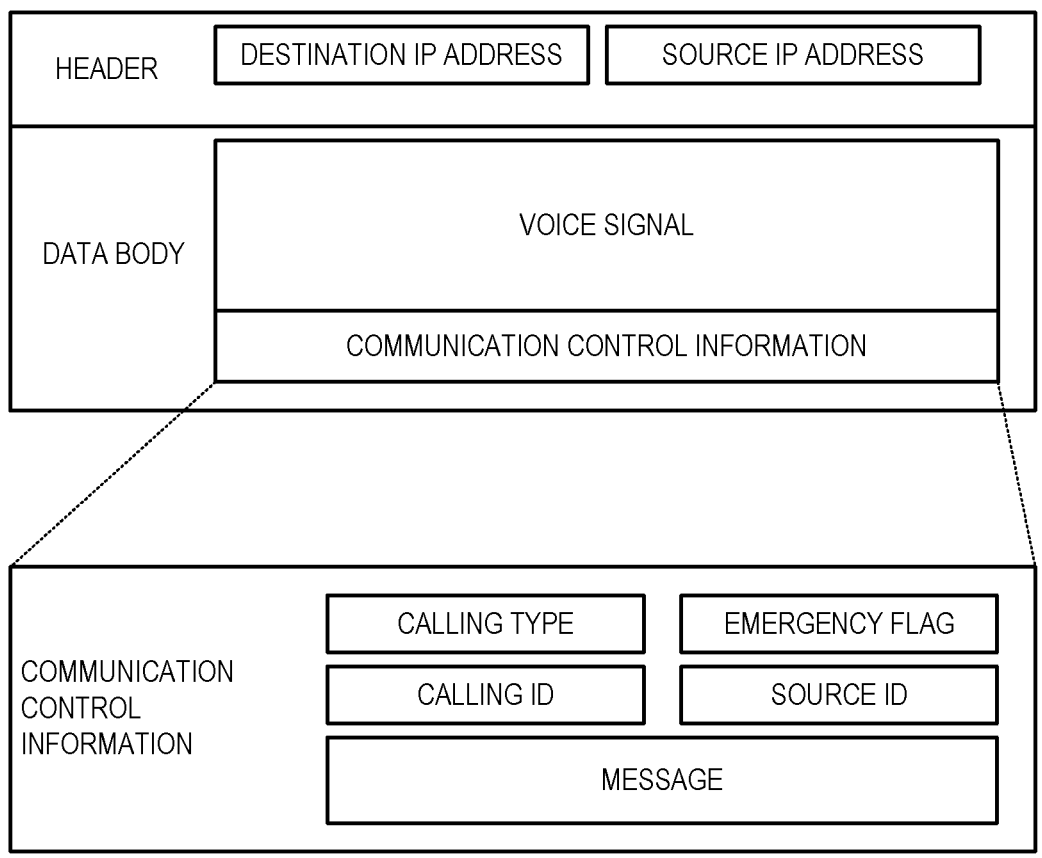
FIG. 2 shows a diagram of structure of a voice packet.

Referring to FIG. 2, structure of the voice packet utilized in the voice communication system is described. The voice packet has a header and a payload (data body). The header includes a destination IP address and a source IP address. The Payload includes a voice data and a communication control information. The voice data is a digitized and compressed one thread of the voice signal (20 milliseconds, for example).

The destination IP address and the source IP address of the header are IP addresses indicating direct destination and transmission source of this voice packet. The voice signal transceived among the terminal devices is transmitted from the terminal device to the server 22 or the gateway 12 included in the voice packet. And then the server 22 or the gateway 12 transmits this voice signal to the terminal device of communication partner included in a new packet. Accordingly, the destination IP address of the voice packet transmitted from the terminal device is not the address of the terminal device of the communication partner but the address the server 22 or the gateway 12.

The communication control information includes a calling type, a calling ID, a source ID, an emergency flag, and a message area. The calling type is information indicating type of communication which is one of the following: an individual communication, a group communication, or a plenary communication. The calling ID is a terminal ID of the communication partner in case of the individual communication or a group ID in case of the group communication. The source ID is the terminal ID of the terminal device having transmitted the voice packet. The emergency flag is a flag indicating the terminal device having transmitted the voice packet is in an emergency mode. The server 22 or the terminal device of the communication partner having received the voice packet with the emergency flag set performs an unusual emergency response. The emergency response will be described later. In the message area, emergency information is written in case of the emergency mode.

FIG. 3 is a block diagram of the LTE terminal device 24. As described above, the terminal device 24 substantially functions as a wireless network device transceiving the voice signal via the base station of the LTE network 21. A control unit 120 controlling the devices is composed of a microprocessor. The control unit 120 has a storage unit 121 storing various data. In the storage unit 121, a configuration data such as the calling ID communicable by the terminal device is stored. To the control unit 120, an operation unit 122, a display unit 123, an audio circuit 124, an LTE communication unit 125, and the GPS positioning unit 126 are connected.

The operation unit 122 includes a key switch such as a PTT switch 220 which receives a user operation and inputs an operation signal of the user operation to the control unit 120. In the operation unit 122, an emergency mode setting means to set the emergency mode is further provided. The emergency mode setting means may be dedicated a key switch and may be also combinations of a plurality of switches or a special operation (such as a long press) of a predetermined key. The control unit 120 set the emergency mode to own terminal device when an operation of the emergency mode setting means is detected. The terminal device is also provided with function to set the emergency mode according to its own determination when the user does not operate the terminal device for long. The details of this function will be described later.

The display unit 123 includes a liquid crystal display. On the liquid crystal display, an identity number of the communication partner selected by the user operation or an identity number of a calling communication partner is displayed. A text indicating the terminal device is in the emergency mode ("emergency" for example) is displayed with blinking on the liquid crystal display when the own terminal device or the terminal device of the communication partner is in the emergency mode.

The audio circuit 124 has a microphone 240 and a speaker 241. The control unit 120 decodes a received voice signal and inputs the voice signal to the audio circuit 124. The audio circuit 124 converts the decoded audio signal to an analog signal and outputs the analog signal from the speaker 241. The audio circuit 124 further converts the voice signal input from the microphone 240 to a digital signal and inputs the digital signal to the control unit 120. The control unit 120 packetizes this digital audio signal into a voice packet and inputs the voice packet to the LTE communication unit 125. The LTE communication unit 125, performing wireless communication in a communication scheme conforming to LTE system, transmits the packet input from the control unit 120 toward the base station 23 and inputs the packet received from the base station 23 to the control unit 120.

The GPS positioning unit 126 receives a plurality of signals transmitted from a plurality of GPS satellites and measures an own position. The measured position information is included in the voice packet and transmitted to the server 22.

By using the LTE terminal device 24 of above configuration, when the user inputs the voice toward the microphone 240 while pressing the PTT switch 220, the LTE terminal device 24 edits this voice signal into a voice packet and transmits to the server 22. The server 22 decides a transfer destination of this voice signal in accordance with the communication control information included in the payload of the received voice packet. The transfer destination is another terminal device, the gateway or the like. The server 22 edits the voice packet destined to the transfer destination transshipping the payload of the received voice packet and transmits the edited voice packet to the transfer destination.

A flow of transferring the voice signal from the LTE terminal device 24 to another terminal device is described as follows. When the PTT switch is on, the LTE terminal device 24 transmits the voice packet storing the voice signal input from the microphone 240 and the communication control information for identifying the communication partner as the payload to the server 22. Thus, when the user turns on the PTT switch 220 and inputs the voice signal, the LTE terminal device 24 edits the communication control information so as to transfer the voice signal to the communication partner selected in advance and makes the voice signal and the communication control information into the packet and transmits the packet to the server 22. The server 22 transfers the received voice signal to the destination terminal device decided in accordance with a calling ID of the communication control information. When the terminal device of the communication partner exists on the LAN 17, the server 22 then transfers the voice signal to the gateway 12. And the gate way 12 transfer this voice signal to the terminal device (LAN terminal device 14). When the terminal device of the communication partner exists on the LTE network 31 of other carrier, the server 22 transfers the voice signal to the LTE terminal device 34 via VPN 35 and the LTE network 31.

In the voice communication system, as the transfer destination of the voice signal is thus decided in accordance with the communication control information included in the voice packet (RTP packet), the communication establishment processing such as the SIP processing needs not to be performed and the user can perform the voice communication having similar feeling in use with typical wireless transceiver such that the user turns on the PTT switch and then talks.

The LTE terminal device 24 is described in FIG. 3, though the LAN terminal device 14 is further constituted in nearly the same. The LAN terminal device 21 has a wireless LAN communication unit in place of the LTE communication unit 45 and transceives the voice packet by communication of the wireless LAN communication unit with the access point 13.

The server 22 controls not only the individual communication which is one to one communication between two terminal devices but also the group communication which is mutual communication among three or more of the terminal devices. In the group communication, the server 22 transfers the received voice signal to the terminal devices 14 belonging to the group other than the terminal device which has transmitted the voice signal (transmitting terminal device). The reason why the voice signal is not transferred to the transmitting terminal device is to prevent from arising of an echo output from the speaker 241 at the transmission terminal device due to delay of the voice signal input from the microphone 240. In the group communication, plurality of the terminal devices may transmit the voice signal simultaneously. In this case, the server 22 performs an echo elimination mixing with these voice signals and then transfers the mixed voice signal to each of the terminal devices. The echo elimination mixing is processing to produce a mixed voice signal other than the voice signal transmitted from the terminal device itself for each of the terminal devices. Consequently, the echo of the voice signal transmitted from own terminal device is not arisen on each of the terminal devices.

Figure 4:
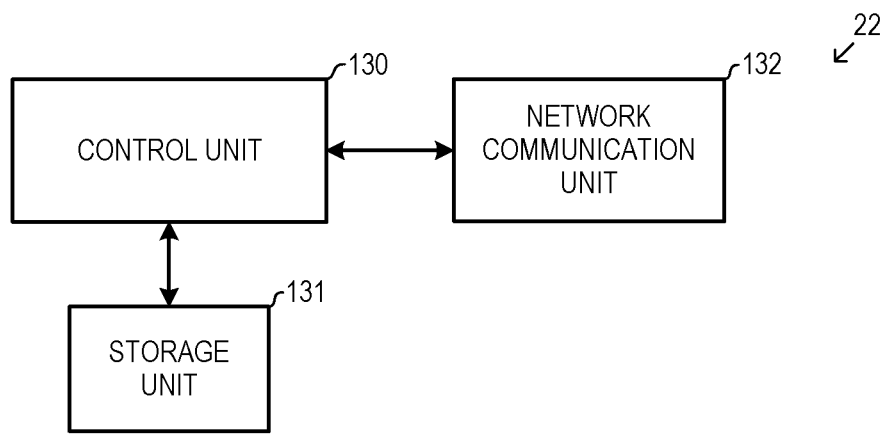
FIG. 4 shows a block diagram of a server.

FIG. 4 is a block diagram of the server 22. The server 22 is connected to the LTE network 21 in the LTE side system 20. The server 22 has a control unit 130, a storage unit 131, and a network communication unit 132. The storage unit 131 is composed of hard disk and RAM, for example, and stores various tables shown in FIG. 5 and FIG. 6 and the configuration data of the terminal device and the like. The control unit 130 performs setting up the terminal device and mixing of the voice signal and the like. The network communication unit 132 controls the communication with inside of the LTE network 21.

In the voice communication system, three types of communication (individual communication, group communication, and plenary communication) are performed. In the individual communication, two terminal devices mutually perform one-to-one communication. The server 22 transfers the voice signal input from one terminal device to the other terminal device. In the group communication, a plurality of the terminal devices (preferably 3 or more of the terminal devices) mutually communicate. The server 22 performs the abovementioned echo elimination mixing with the voice signal received from the terminal devices and transfers the echo elimination mixed voice signal to each of the terminal devices in the group. The plenary communication is one of the group communication that all the terminal devices existing in system 1 are to be belonging terminal devices.

The ID of the terminal device existing in the system 1, and a group (talk group) information (group ID and ID of belonging terminal) are previously stored in the server 22 and reported to each of the terminal devices from the server 22. After selecting ID of the communication partner (terminal ID or group ID), the user of the terminal device pushes the PTT switch 220 and inputs the voice signal. The terminal device produces the voice packet having the calling ID which is the selected ID and the calling type which is the selected type of communication (written in the communication control information) and then transmits the voice packet to the server 22.

When the server 22 receives the voice packet from the terminal device, the server 22 starts transmitting the voice signal (session) in accordance with the calling ID of the voice packet. When the session starts, the server 22 registers a mixing group for storing the ID of the terminal device participating in the session in the mixing table shown in FIG. 6. The details of the mixing table will be described later.

FIG. 5C shows a priority table. In the priority table, priority order of the three communication mode (calling type) executed in the system, which are the individual communication, the group communication, and the plenary communication, are stored. In accordance with the table, the priority of the plenary communication is the highest, the priority of the individual communication is the second highest, and the priority of the group communication is the lowest. If the terminal device is targeted from a plurality of the session, the server 22 make the terminal device participate to the session previously started in principle. However, if the priority of a session started later is higher than the session previously started, the terminal device is made to move from the session previously started to the session started later. The storage unit 131 storing the priority table shown in FIG. 5C corresponds to a priority information storage unit 131 according to the present invention.

It is noted that to the session including the terminal device in the emergency mode (emergency mode session), the special priority having much higher priority than the priority defined in the priority table is set. Thus, the terminal device participating in the emergency mode session cannot move to other session. Furthermore, the terminal device in communicating in other session leaves from the present session and move to the emergency mode session when called by the emergency mode session.

FIG. 5A show the terminal table 301. The terminal table is a table for managing the terminal device by the server 22 and stored in the storage unit 131. Each of the terminal devices are identified by the terminal ID which is identification information uniquely allocated to each of the terminal devices. In this embodiment, a terminal number is used as the terminal ID. In the terminal table, an active flag, the emergency flag, and the position information are stored for each of the terminal ID. The active flag is a flag indicating that the terminal device is communicable on the network. When powered on, the terminal device performs start-up setting by communicating with the server 22. The server 22 sets the active flag of the terminal device when the above communication is performed. In an example shown in FIG. 5A, the terminal device of the terminal ID=3 is non-active therefore its active flag in the terminal table is not set.

The emergency flag is a flag indicating that the terminal device in the emergency mode. The terminal device set to the emergency mode transmits the alert packet (described later) to the server 22. When the server 22 receives the alert packet, the server 22 sets the emergency flag of the terminal device while performing predetermined corresponding operation. In the example shown in FIG. 5A, the terminal device of the terminal ID=2 is in the emergency mode therefore its emergency flag in the terminal table is set.

FIG. 5B shows the group table. The group table is a table managing the talk group by the server 22 and stores in the storage unit 131. Each of the groups (talk group) is identified by the group ID which is identification information uniquely allocated to each of the groups. In this embodiment, a group number with "G" prefixed to the top of the group number is used as the group ID. In the group table, the terminal ID of the terminal device belonging to the group (belonging terminal device) is stored for each of the group ID. The group having the group ID "A" of the lowest line in the group table is a group performing the plenary communication, and all the terminal devices on the system are belonging.

When the group communication is performed, all the terminal devices belonging to the talk groups participate in the session of the group communication (mixing group) in principle. However, in starting of the session, the terminal device which is non-active or performing higher priority communication do not participate in this session. Furthermore, during session, the terminal device received the call having higher priority calling type leaves from the session and participates in the session having higher priority calling type.

The terminal table, the group table, and the priority table are performed maintenance via the management device 18. Namely, the terminal device registered in the terminal table, the talk group registered in the group table, and the priority order of each of the calling type are changeable.

FIG. 6 shows the mixing table. FIG. 6A and FIG. 6B show contents of the mixing table at different point of time respectively. In the mixing table, a session ID, a calling terminal ID, a participating terminal ID, an excluded terminal ID, and the emergency flag are stored for each of the sessions (mixing groups). The emergency flag is a flag indicating that the session is the emergency mode session.

The session ID is an ID identifying this session (mixing group). In the group calling (including a plenary calling), the calling ID (group ID) written in the voice packet in calling (calling voice packet) is used as the session ID. "G1" in FIG. 6A and FIG. 6B correspond to the session ID. In the individual calling, the terminal ID of the terminal device which sent the calling voice packet (calling terminal device) is used. "19" and "30" in the FIG. 6A and FIG. 6B correspond to the session ID.

In FIG. 6A, the sessions (mixing groups) are made in the mixing table shown in this diagram. One of the sessions is the group communication of the session ID=G1. Five terminal devices of ID=from 1 to 5 belong in the group G1, as shown in the group table in FIG. 5B. The individual communication of the session ID=19 has been established separately and its communication partner is the terminal device of terminal ID=5. As the individual communication has higher priority than the group communication, the terminal device of the terminal ID=5 leaves from the group communication of G1 and moves to the individual communication. Accordingly, "5" is stored in a excluded terminal device field of the session ID=G1 in the mixing table. Apart from these sessions, the individual communication having the session ID=30 is also established.

FIG. 6B shows an example contents of the mixing table when the terminal device of the terminal ID=2 set in the emergency mode from the situation shown in FIG. 6A. As the terminal device of the terminal ID=2 has set to the emergency mode and has started the voice communication, the group communication of the session ID=G1 has entered the emergency mode session and thus the emergency flag of the mixing table has set. Consequently, the terminal device of the terminal ID=5, performed the individual communication with the terminal device of the terminal ID=19, has left from this session (has canceled the individual communication) and has returned to the group communication of the session ID=G1 that is the emergency mode session. However, as the individual communication of the session ID=30 has no relation with the emergency mode session, the individual communication is kept communicating. It should be noted that the mixing group cancels from the mixing table when no voice signal transmits from any of the participating terminal devices for 1.5 seconds.

Figure 7A:
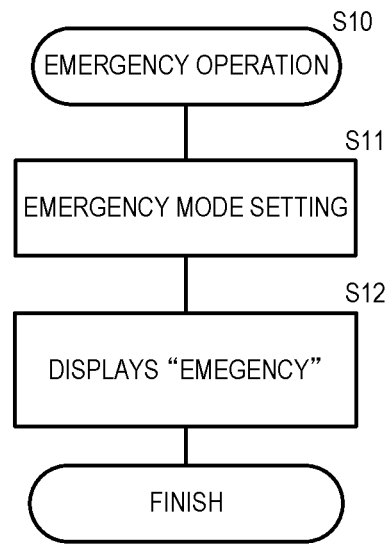
FIG. 7A shows a flow chart of an operation of setting an emergency mode of the terminal device.

FIG. 7A shows a flow chart of the control unit 120 when receiving an operation to set to the emergency mode. When the user performs key operation (emergency operation) to set to the emergency mode, this processing is executed. When the emergency operation is executed by the user (S 10), the control unit 120 sets the emergency mode (S 11). The emergency flag provided in the storage unit 121 is set by the control unit 120. With this, the emergency mode is set to the terminal device. To notify the user that the emergency mode has been set, the control unit 120 displays "Emergency" (words indicating that the terminal device is in the emergency mode) with blinking on the liquid crystal display of the display unit 123 (S 12). The control unit 120 and the operation unit 122, which execute the process of S 10 and S 11 corresponds to a mode setting unit according to the present invention.

Figure 7B:
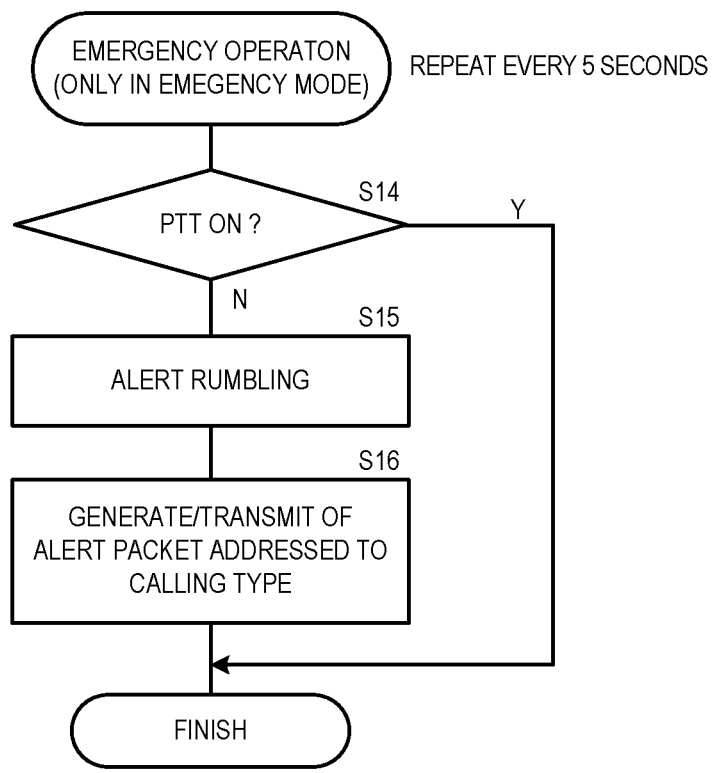
FIG. 7B shows a flow chart of an operation during the emergency mode of the terminal device.

FIG. 7B shows a flow chart of the control unit 120 when in the emergency mode. The operation is executed every 5 seconds when the emergency mode is set (when the emergency flag is set). At first, it is decided whether the PTT switch 220 is on or not (S 14). If the PTT switch 220 is ON (Yes in S 14), this process is finished without taking further action as it is notified by the communication of voice signal that the emergency mode is set to the server 22.

When the PTT switch 220 is not ON (No in S 14), the control unit 120 makes an alarm sound (alert) rumbled during a predetermined time (S 15), produces the alert packet having the calling ID being preselected communication destination (individual or group or the like), and transmits the alert packet to the server 22 (S 16). The predetermined time is equal or less than 5 seconds of operation interval, and preferably about 1 second.

Although the alert packet is a packet having same form as the voice packet shown in FIG. 2, the voice signal is not included in the payload, the emergency flag of the communication control information is set in place of the voice signal, and information indicating the emergency are written in the message area. Additionally, the position information measured with the GPS positioning unit 126 is also contained in the alert packet. When the server 22 receives the alert packet from the terminal device, the server 22 transfers the alert packet to the terminal device to be a communication partner, and set the emergency flag of the terminal table and the mixing table.

When the emergency mode is set, the alert packet is transmitted to the server 22 every 5 seconds by the operation in FIG. 7B even if the user does not make any subsequent operation. Consequently, an administrator or the user of other terminal device come to know emergency state of the terminal device easily.

The control unit 120 executing the process of S 12 and S 15, the display unit 123, and the audio circuit 124 correspond to a notification unit according to the present invention. It should be noted that as a process of the notification unit, the control unit 120 may execute processes of S 53 and S 55 shown in FIG. 9A. The control unit 120 and a LTE transmission unit 125 executing a process of S 16 correspond to a notification signal transmission unit according to the present invention.

Figure 7C:
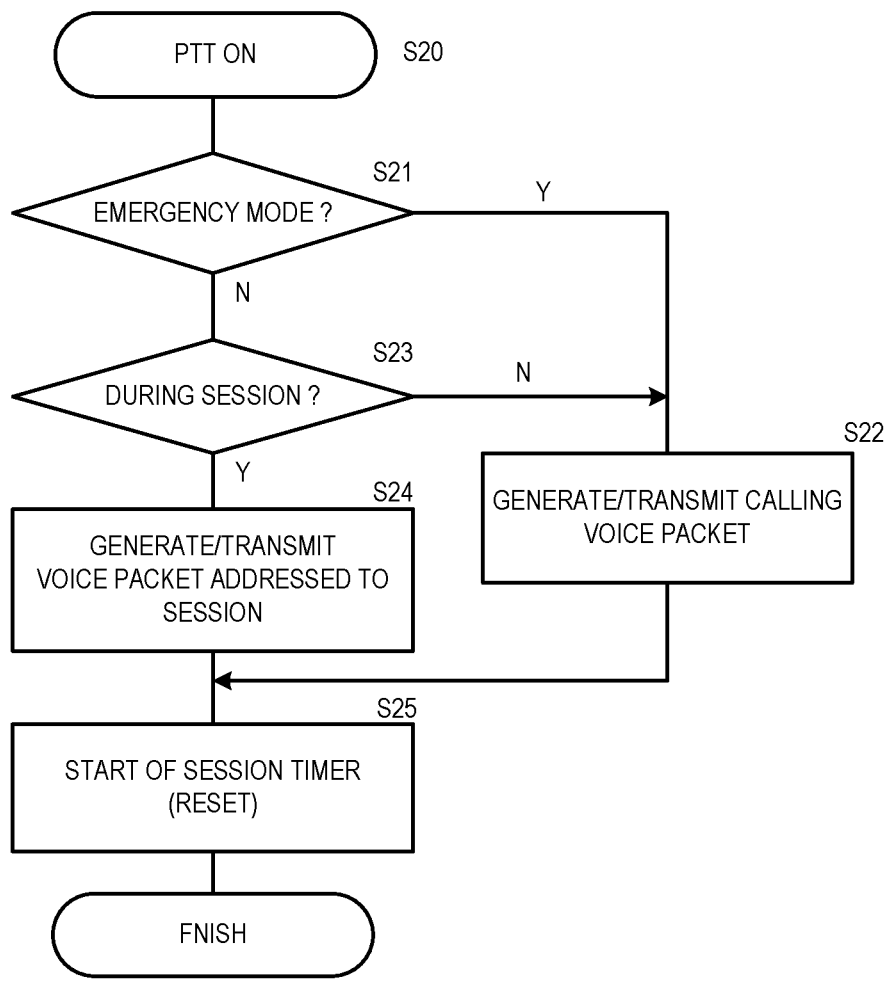

FIG. 7C is flow chart illustrating operation when the PTT switch is ON. When the PTT switch 220 is ON by the user (S 20), the control unit 120 decides whether the terminal device is in the emergency mode or not. When in the emergency mode (YES in S 21), the voice packet having preselected communication destination (individual, group, and the like) as the calling ID is produced, and transmitted to the server 22 (S 22) so as to form a session of the emergency mode. In S 22, when the emergency mode is set by an operation shown in the FIG. 7A, the emergency flag of the communication control information is set in advance.

When not in the emergency mode (NO in S 21), it is decided that the terminal device is now under the session or not (S 23). "Under the session" means that the terminal device is in the communication state with any of the communication partners (individual, group, and the like). Once the control unit 120 initiates a session with any of the communication partners, the control unit 120 maintains the session for 5 seconds from the last transmission or reception of the voice signal. When the voice signal is not transceived for five seconds, the control unit 120 cancels the session, and permits start of a new session with next new communication partner. The period of the time that is abovementioned equal or less than 5 seconds means "under the session".

In not being under the session (NO in S 23), the voice packet having the preselected communication destination (individual, group, and the like) as the calling ID is produced, and transmitted to the server 22 (S 22). In being under the session (YES in S 23), the voice packet attached ID of the session is edited, and transmitted to the server 22 (S 24). After the transmission of the voice packet, a session timer measuring maintaining time of the session is made to start (S 25). The session timer is a timer to time up in five seconds. In S 25, when the session timer has already started, the termer is reset to 5 seconds. The control unit 120 and the LTE transmission unit 125 which execute the processing of S 22 and S 24 correspond to a voice transmission unit according to the present invention.

Figure 8:
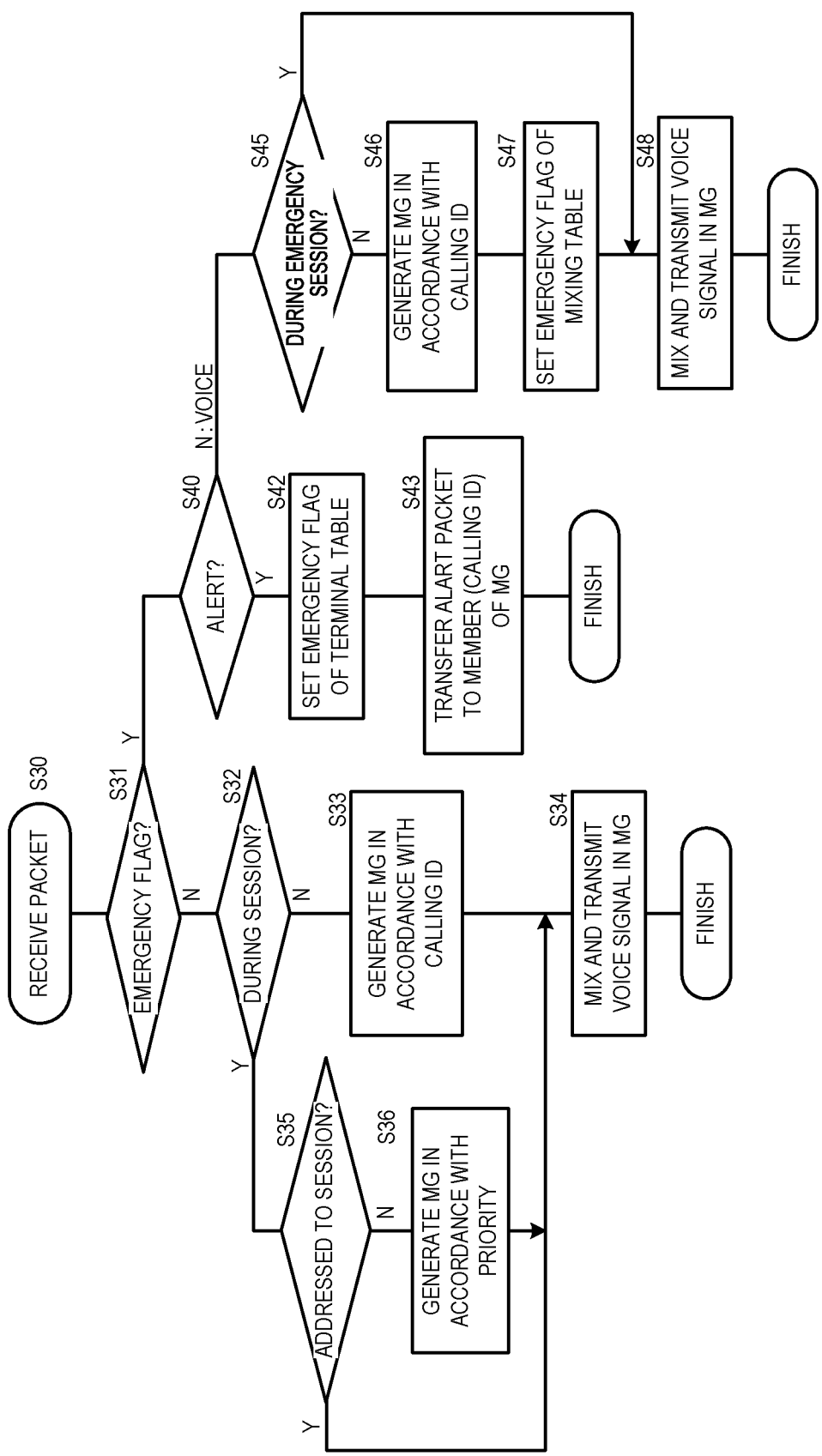
FIG. 8 shows a flow chart of an operation of the server.

FIG. 8 is a flow chart illustrating operation of the server 22. In the flow chart, an operation when the server 22 receives the packet from the terminal device is mainly illustrated. It should be noted that the voice signal is divided into a plurality of the voice packet, and transmitted as packet series, but the processing is executed when a head packet (calling packet) of the packet series is received. When the packet is received from the terminal device (s 30), the server 22 decides if the emergency flag is set in the received packet. If the emergency flag is set (YES in S 31), the server 22 proceeds the processing at and after S 40. If the emergency flag is not set (NO in S 31), the server executes normal operation at and after S 32.

In S 32, the server 22 decides whether the terminal device transmitted the voice packet is in the session or not, that is, the server 22 decides if the terminal device participates any of the mixing group (S 32). When not in session (NO in S 32), the server 22 forms a mixing group (MG) in accordance with the calling ID included in the communication control information of the received voice packet (S 33). Then, a participating terminal is collected in accordance with the priority of current calling type and the priority of other session. In the calling for the group communication, for example, the terminal performing other individual communication is removed or the like. The received voice signal is transferred to other terminal device of the formed mixing group (s 34). Then, when other voice signal receiving in parallel is existed, the voice signal is performed the echo elimination mixing, and transferred to each of the terminal devices.

If the terminal device transmitted the voice packet is in the session (YES in S 32), the server 22 decides whether the received voice packet is addressed to the session or not (S 35). If the voice packet is addressed to the session, the server 22 transfers the voice signal of the pay load to other terminal device in the mixing group (S 34).

When the voice packet specified the calling ID of other communication partner though the terminal device is in the session (NO in S 35), as a new calling for the terminal device currently in session, the priority between the session in which the terminal device and the terminal device specified by the calling ID are currently participating (mixing group) and the session newly formed (mixing group) are compared, and the session newly formed (mixing group) is formed by allowing the terminal device having lower priority in the current session to participate in (S 36). Then the processing proceeds to S 34, the voice signal is transferred to other terminal device in the newly formed mixing group (S 34).

When the emergency flag of the received packet is set (YES in S 31), the server 22 decides whether the packet is the alert packet or not (whether the voice packet or the alert packet) (S 40). As described above, the alert packet is a packet to be transmitted from the terminal device to the server 22 once in every 5 seconds without any operation by the user when the emergency mode is set to the terminal device. If the received packet is the alert packet (YES in S 40), the server 22 sets the emergency flag corresponding to the session (mixing group) of the mixing table (S 42). If the emergency flag is already set, the emergency flag may remain. The server 22 transfers the alert packet to all the terminal devices specified by the calling ID of the received alert packet (S 43). The alert packet is transferred to all the targeted terminal devices without considering whether each of the terminal devices participate in other mixing group or not. As the alert packet is one packet (or few packets), the alert packet can be transmitted at the interval of the voice packet series even to the terminal device in voice communication. The operation of the terminal device having received the alert packet is described in flow chart of FIG. 9.

In S 40, if the packet to which the emergency flag is set is the voice packet including the voice signal (No in S 40), the server 22 decides whether the terminal device transmitted the voice packet is in the session of the emergency mode or not (S 45). If not in the session (NO in S 45), the server 22 forms the mixing group in accordance with the calling ID included in the communication control information of the received voice packet (S 46), and sets the emergency flag of the mixing group (S 47). The server 22 allows all of the terminal device specified by the calling ID of the voice packet having set the emergency flag to participate in the mixing group. The server 22 transfers the voice signal of the voice packet to other terminal device of the mixing group (S 48). When the session of the emergency mode has already started in S 45 (NO in S 45), the server proceeds the processing to S 48, and transfers the voice signal of the voice packet to other terminal device of the mixing group.

The control unit 130 and the storage unit 131 executing the processing of S 33, S 36, and S 46 (tables shown in FIG. 5 and FIG. 6) correspond to a session management unit according to the present invention. The control unit 130 and the network communication unit 132 executing the processing of S 34 and S 48 corresponds to a voice transfer unit according to the present invention. The control unit 130 and the network communication unit 132 executing the processing of S 43 corresponds to a specific signal transfer unit according to the present invention.

Figure 9A:
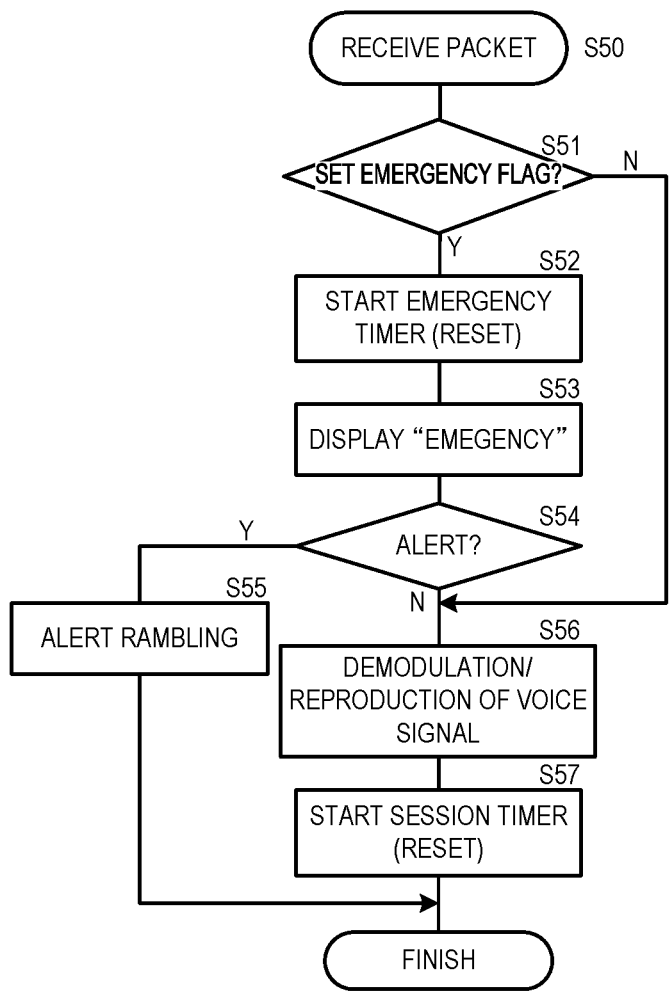
FIG. 9A shows a flow chart of an operation when a packet of the terminal device is received.

FIG. 9 is a flow chart illustrating operation when the voice packet of the terminal device is received, and operation of a timer management. FIG. 9A is a flow chart illustrating operation of the control unit 120 when the terminal device receives the packet from the server 22. If the terminal device receives the packet (S 50), the control unit 129 decides whether the emergency flag of the packet is set or not (S 51). If no emergency flag is set (NO in S 51), as it is the normal voice packet, the processing is proceeded to S 56, the voice signal included in the voice packet is demodulated and reproduced (S 56). The session timer is started (S 57), and then the operation is terminated. The session timer is a soft timer set in the storage unit 121, and times up in 5 seconds. If the session timer has already started, remaining time is reset to 5 seconds.

When the emergency flag of the received packet is set (YES in S 51), as the terminal device of the communication partner is assumed to be in emergency mode, an emergency timer is made to be started (S 52). The emergency timer is a soft timer set in the storage unit 121, and times up in 5 seconds. If the emergency timer has already started, remaining time is reset to 5 seconds. The control unit 120 allows the liquid display of the display unit 123 to display "emergency" (a text indicating the terminal device is in the emergency) with blinking (S 53).

The control unit 120 decides if the received voice packet is the alert packet (S 54). If the received voice packet is the alert packet (YES in S 54), the alarm sound is produced inside the terminal device and rumbled for a predetermined time (S 55). The predetermined time is preferably about 1 second. As the alert packet is transmitted from the terminal device in the emergency mode once in every 5 seconds, the alarm sound is also rumbled in the terminal device once in every 5 seconds. It should be noted, as described in FIG. 8, the alert packet is transferred to all the terminal devices specified by the calling ID without producing the session (mixing group) (without considering other session). Thus, even when the terminal device is communicating in other session, the alert packet is received in the interval, and the alarm sound is rumbled. If the alarm sound is rumbled during reproduction of the voice signal of the session, although the voice signal is interrupted, after the alarm sound is stopped, the voice signal of the session is reproduced same as before.

In S 54, if the received packet is a voice packet containing the voice signal (NO in S 54), the control unit 120 proceeds the processing to S 56, demodulates and reproduces the voice signal.

Figure 9B:
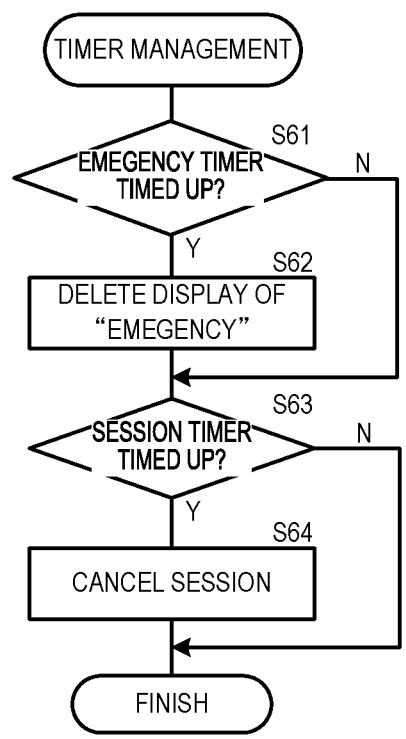
FIG. 9B shows a flowchart of a timer management operation of the terminal device.

FIG. 9B is a flow chart illustrating timer management operation. This operation is executed regularly (every 5 ms, for example). The control unit 120 decides if the emergency timer times up (S 61). If the emergency timer times up (YES in S 61), the blinking display of "emergency" is deleted as it means the emergency mode of other terminal device is cancelled (S 62). Then the control unit 120 decides if the session timer times up (S 63). If the session time has timed up, the session is canceled (S 64).

The emergency mode set in the terminal device can be cancelled by the user operation to the terminal device. The user operation is such as turning on a power supply again, performing emergency operation again, and the like. The emergency mode may cancel automatically with the condition that the emergency mode is continued for a predetermined time. Moreover, when a response is received from the communication partner set in the emergency mode in advance, the emergency mode may be cancelled.

According to the abovementioned embodiment, in the terminal device set in the emergency mode, the text of "Emergency" is displayed in blinking, and the alarm sound is rumbled. However, it may be risky the fact that the user sets the terminal device to the emergency mode is known around. Thus, the emergency mode can be set without displaying "Emergency" or rumbling the alarm sound. The operation mode is called as silent mode.

Furthermore, in the terminal device to be the communication partner of the terminal device in the emergency mode, the text of "Emergency" is displayed in blinking, the alarm sound is rumbled once in every five seconds. For the user, it may be troublesome. Then, it may be configurable not to allow the terminal device to be rumbled the alarm sound even when the alert packet is received. Even if the alarm sound does not ramble, the user is notified the emergency mode of other terminal device by blinking the display with "Emergency" or causing vibration of a vibrator or the like.

In the abovementioned embodiment, the case when the emergency mode is set by the user operation is described. The terminal device may set the emergency mode by own decision. The operation of the terminal device will be described as below. When the user comes to be unable to operate the terminal device due to any accident, the terminal device will have an operation mentioned as follows to assume the accident to be notified quickly. This function is called as a Lone Worker function.

(1) If there has been no operation for the first predetermined time or longer, a warning is issued to the user so as to operate the terminal device.

(2) Even though the warning has been issued, if the user does not operate the terminal device, the terminal device sets to the emergency mode by own, and transmits the alert packet to the server and other terminal device (Operation in FIG. 7B).

(3) If the user performs any operation (any operation will be fine) to the terminal device, the abovementioned warning and the emergency mode are cancelled, and the terminal device returns to normal operation.

Figure 10:
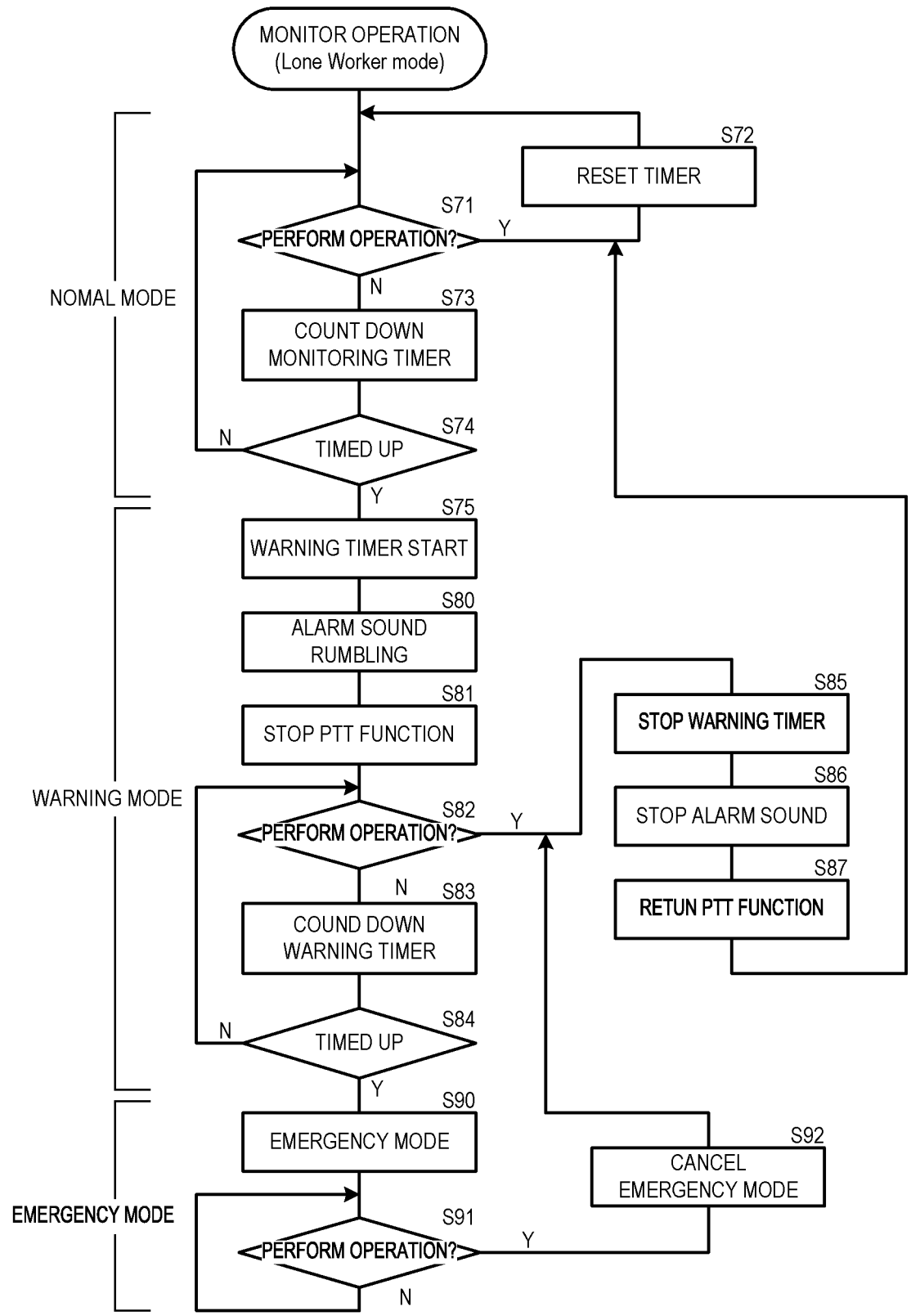
FIG. 10 shows a flow chart of an operation of the terminal device.

FIG. 10 is a flowchart illustrating the Lone Worker function of the control unit 120 of the terminal device. The control unit 120 always monitors if any operation is performed to the terminal device by the user (S 71, S 80, S 91).

In a normal mode in which the terminal device functions as usual, the control unit 120 monitors if there is an operation from the user (S 71), and if a monitoring timer is timed up (S 74) while counting down the monitoring timer (S 73). The monitoring timer is a timer to have an operation like a watchdog timer, and timed up approximately when it may not be abnormal (60 minutes, for example) even if the user does not operate the terminal device (transceiver). If the user performs any operation to the terminal device (YES in S 71), the monitoring timer is reset (S 72), and the normal mode is maintained. This operation may be a normal operation such as performing the voice communication, or changing the setting.

When the monitoring timer is timed up without performing any operation to the terminal device by the user (YES in S 74), the terminal device enters a warning mode. The control unit 120 makes a warning timer started (S 75), makes the alarm sound rumbled to urge the user for operation (S 80), and halts PTT function (S 81). The reason for halting the PTT function is to avoid the terminal device to be in a transmission state even when the user pushes the PTT switch to cancel the warning mode. To perform the voice communication when the user pushes the PTT switch 220, the user may push the PTT switch 220 after performing any operation to the terminal device (it may be turned on the PTT switch 220) and making the terminal device return the operation in the normal mode.

Subsequently, the control unit 120 monitors if the operation by the user is performed (S 82), or if the warning timer is timed up (S 84) while counting down the warning timer (S 83). The warning timer is for counting the time urging the operation of the terminal to the user by rumbling the alarm sound, and is timed up about one or two minutes. When the user performs any operation to the terminal device (YES in S 82), the control unit 120 makes the warning timer reset and stop (S 85), stops the alarm sound (S 86), and makes the PTT function return (S 87). Then, The monitoring timer is reset in S 72, and makes the operation return to the normal mode.

If the warning timer is timed up without any operation to the terminal device by the user (YES in S 84), the control unit sets the emergency mode due to non-operation (S 90), and performs an emergency operation shown in FIG. 7B. With this, the emergency situation (the user does not operate the terminal device at all) can be quickly notified to other terminal device (user). If any operation is performed to the terminal device by the user in such the situation (YES in S 91), the control unit 120 cancels the emergency mode due to the non-operation (S 92), makes the warning timer reset and stop (S 85), stops the alarm sound (S 86), makes the PTT function return (S 87), resets the monitoring timer (S 72), and makes the operation return to the normal mode.

In the management device 18, an icon of the terminal device which is in the emergency mode due to the non-operation is also changed to the appearance showing the emergency mode. The control unit 120 executing the processing shown in the flow chart of FIG. 10 corresponds to the non-operation decision unit according to the present invention.

As described above, when the communication is performed by setting the emergency mode to the terminal device (particular mode according to the present invention), the session (mixing group) formed by the communication becomes to have higher priority. The particular mode (having higher priority) such as setting operation for the terminal device of the user, non-operation for the terminal device of the user is set to the terminal device by the terminal device. The particular mode is not limited to the emergency mode. The special mode may be set in case that the user wish to have a preferential communication, wish to make the terminal device operate preferentially, and the like.

The voice communication system according to above-mentioned embodiment, although it is constructed by connecting the LAN 17 and the LTE network 21, 31 via the gateway 12 and the VPN 35, it can be constructed only the LAN, or the only the LTE network, for example.

REFERENCE NUMERALS

10 LAN side system
12 gateway
14 LAN terminal device
17 Local area network
18 management device
20,30 LTE side system
21,31 LTE network
22 server
24,34 LTE terminal device

What is claimed is:

1. A voice communication system comprising:
a relaying device and a plurality of terminal devices communicating with each other over a communication network, wherein
the terminal device comprises
a voice transmission unit transmitting a calling voice signal attached information specifying a terminal device of a communication partner to the relaying device and
a mode setting unit for setting the own terminal device to a particular mode,
the relaying device comprises
a session management unit forming a session of voice communication when the calling voice signal is received from the terminal device, wherein the terminal device and a terminal device specified by the calling voice signal participates the session,
a voice transfer unit mutually transferring the voice signal among the terminal devices participating in the session, and
a priority information storage unit storing a priority information pertaining to the session, wherein
when the calling voice signal specifying the terminal device participating in an existing session as a communication partner is received from the terminal device not set to the particular mode, the session management unit decides a priority between the existing session and a new session to be formed by the current calling voice signal in accordance with the priority information,
the session management unit removes the terminal device participating in the existing session from the existing session and makes said terminal device participate in the new session when the priority of the new session is higher than the priority of the existing session, and
when a specific calling voice signal specifying the terminal device participating in the existing session as a communication partner is received from the terminal device set to the particular mode, the session management unit removes the terminal device participating in the existing session from the existing session and makes said terminal device participate in a session to be formed by the specific calling voice signal regardless of the priority of both sessions.

2. The voice communication system according to claim 1, wherein
the terminal device further comprises
a notification signal transmission unit transmitting a specific signal attached information specifying a destination terminal device to the relaying device when the terminal device is set to the particular mode and
a notification unit outputting by one or both of a voice and a display indicating the particular mode of the terminal device when the terminal device is set to the particular mode,
the relaying device further comprises a specific signal transfer unit transferring the specific signal to the terminal device specified as the transfer destination when the specific signal is received, wherein
the notification unit of the terminal device outputs by one or both of the voice and the display indicating the particular mode of said other terminal device when the specific signal transferred from the relaying device is received.

3. The voice communication system according to claim 2, wherein
the terminal device further comprises
an operation unit receiving a user operation and
a non-operation decision unit measuring non-operation time that the user does not operate the operation unit, wherein the mode setting unit sets the own terminal device to the particular mode when the non-operation decision unit measures predetermined time.

4. The voice communication system according to claim 3, wherein the operation unit comprises a PTT switch operating the voice transmission unit, the operation unit halts function of the PTT switch when the particular mode is set, and the mode setting unit cancels the particular mode when an operation of the operation unit is detected.

5. A relaying device comprising:

a network communication unit connected with a communication network and communicating with a plurality of terminal devices over the communication network, a session management unit forming a session of a voice communication in which a terminal device and other terminal device specified by a calling voice signal participate when the calling voice signal attached information specifying the terminal device of a communication partner is received from the terminal device, a voice transfer unit mutually transmitting a voice signal among the terminal devices participating in the session; and a priority information storage unit storing a priority information pertaining to the session, wherein when the calling voice signal specifying the terminal device participating in an existing session as a communication partner is received from the terminal device not set to the particular mode, the session management unit decides a priority between the existing session and a new session to be formed by the current calling voice signal in accordance with the priority information and the session management unit removes the terminal device participating in the existing session from the existing session and makes said terminal device participate in the new session when the priority of the new session is higher than the priority of the existing session, and when a specific calling voice signal specifying the terminal device participating in the existing session as a communication partner is received from the terminal device set to the particular mode, the session management unit removes the terminal device participating in the existing session from the existing session and makes said terminal device participate in a session to be formed by the specific calling voice signal regardless of the priority of both sessions.

6. The relaying device according to claim 5 further comprising:

a specific signal transfer unit transferring the specific signal to the terminal device specified as transfer destination other than the aforementioned transfer of the voice signal when the specific signal attached information specifying a destination terminal device is received from the terminal device set to the particular mode.

7. A terminal device comprising:

a network communication unit communicating with a relaying device over a communication network;

a voice transmission unit transmitting a calling voice signal attached information specifying the terminal device of a communication partner to the relaying device;

a mode setting unit for setting the own terminal device to a particular mode;

a notification signal transmission unit transmitting a specific signal attached information specifying a destination terminal device to the relaying device when the terminal device set to the particular mode; and a notification unit outputting by one or both of a voice and/or a display indicating the particular mode of the terminal device when the terminal device is set to the particular mode; wherein the voice transmission unit attaches information to the calling voice signal indicating the own terminal device is setting to the particular mode when the terminal device is set to the particular mode.

8. The terminal device according to claim 7, wherein the notification unit outputs by one or both of the voice and/or on the display indicating the particular mode of other terminal device when the specific signal transferred from the relaying device is received.

9. The terminal device according to claim 7, further comprising:

an operation unit receiving a user operation, and a non-operation decision unit measuring non-operation time that a user does not operate the operation unit, wherein the mode setting unit sets the own terminal device to the particular mode when the non-operation decision unit measures predetermined time.

10. The terminal device according to claim 9, wherein the operation unit comprises a PTT switch operating the voice transmission unit, the operation unit halts function of the PTT switch when the particular mode is set, and the mode setting unit cancels the particular mode when an operation of the operation unit is detected.

11. A session management method, wherein a relaying device connected to a network, when a call signal from a calling terminal device on the network to another terminal device is received, forms a session of a voice communication including the calling terminal device and a called terminal device which is the another terminal device as participating terminal devices, when a certain terminal device becomes in a condition of participating a plurality of sessions after having performed abovementioned processing for a plurality of times, the relaying device decides a session being participated by the certain terminal device in accordance with a predetermined priority, when the relaying device receives a call signal attached information indicating a particular mode calling to a terminal device which already participates in another session, the relaying device deletes the terminal device from the another session and makes the terminal device participate in the session of the call signal.

12. A non-transitory computer-readable recording medium in which a program executed by a relaying device in a voice communication system is stored, the voice communication system being configured with the relaying device and a plurality of terminal devices, wherein a control unit of the relaying device communicating with the terminal devices over a communication network is functioned as:

a session management means forming a session of a voice communication being participated by a terminal device and a terminal device specified by a calling voice signal when a calling voice signal attached information specifying the terminal device of a communication partner in a voice signal from the terminal device is received; and a transfer means mutually transferring the voice signal among the terminal devices participating in the session; wherein, the session management means:

decides a priority between an existing session and a new session to be formed by the calling voice signal in accordance with a predetermined priority information when a calling voice signal specifying the terminal device participating in the existing session as a communication partner is received, removes the terminal device participating in the existing session from the existing session and make the terminal device participate in the new session when the priority of the new session is higher than the priority of the existing session, and removes the terminal device participating in the existing session from the existing session and makes the terminal device participate in a session to be formed by the calling voice signal regardless of the priority of both sessions when the calling voice signal specifying the terminal device participating in the existing session as the communication partner is received from the terminal device set to the particular mode.

13. The non-transitory, computer-readable recording medium according to claim 12, wherein when a specific signal attached information specifying a destination terminal device is received from the terminal device set to the particular mode, the control unit is further made to be functioned as a specific signal transfer means transferring the specific signal to the terminal device specified as the transfer destination.

* * * * *